March 26, 1935.  S. DE ORLOW  1,995,472
CLOSURE RETAINING DEVICE
Filed June 23, 1933
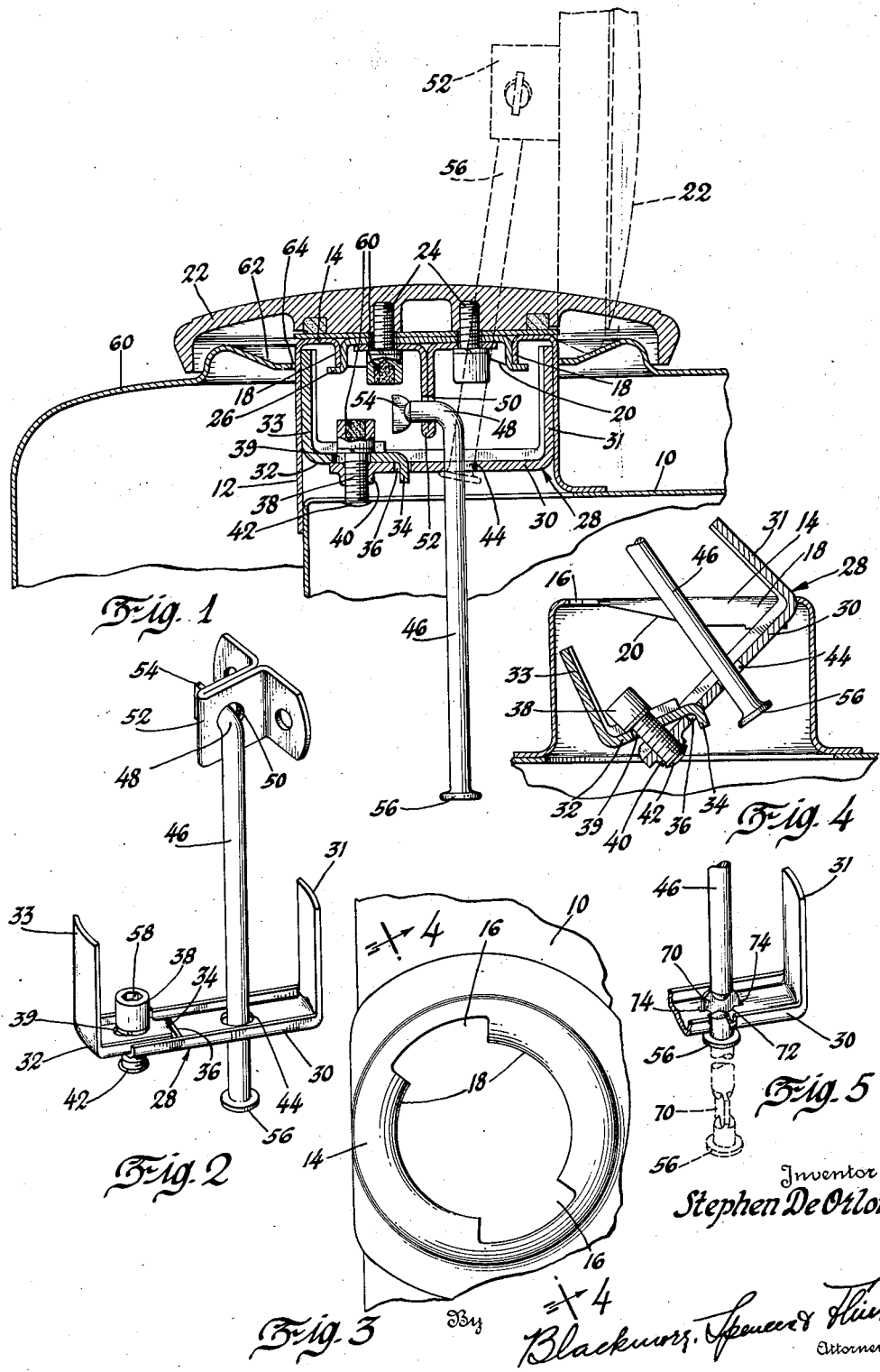

Patented Mar. 26, 1935

1,995,472

UNITED STATES PATENT OFFICE 1,995,472

CLOSURE RETAINING DEVICE

Stephen De Orlow, Detroit, Mich., assignor to Ternstedt Manufacturing Company, Detroit, Mich., a corporation of Michigan Application June 23, 1933, Serial No. 677,232

9 Claims. (Cl. 220—24)

This invention relates to retaining devices of the type which are provided to connect closure members, such as radiator and fuel tank caps, to the filler neck openings which they are intended to cover, which retaining devices permit the closure to be removed a limited distance away from the filler neck opening to permit the filling of the container with which they are associated, but which will prevent accidental misplacement or theft of the closure from the container.

An object of the invention is to provide such a retaining device which may be diminished in length to permit its insertion into the filler neck beneath an inwardly extending flange which is formed thereon and which may thereafter be increased in length to cause it to firmly engage the inside wall of the filler neck, and which may then be locked in place in the filler neck in such manner as to prevent removal therefrom.

A further object is to provide such a retaining device which is so designed that when the closure is moved to a position away from the filler neck opening to permit liquid to be poured into the latter, the closure will be held in a definite position wherein it cannot come into contact with the surrounding parts, such as the shell which ordinarily extends around the radiator, which shell in many cases is finished with lacquer or enamel, which finish might be marred or damaged if the closure were permitted to strike against it.

A still further object of the invention is to provide a retaining device which is so designed that it will serve to hold the closure in such position when it is removed from the filler neck opening that any liquid which may be present on the under side of the closure and which may drip off will fall into a trough portion which is formed in the shell which encases the radiator. This is particularly desirable when the liquid tending to drip off the closure contains alcohol such as is used in radiators as an anti-freeze medium, as such alcohol if permitted to come into contact with a lacquer finish on the radiator shell will cause the finish to become spotted or discolored. By causing the radiator cap to assume a position which will insure that any drippings therefrom will fall into the trough, this condition will be overcome.

Other objects and advantages of the invention will be apparent upon referring to the specification and accompanying drawing, in which:

Figure 1 is a fragmentary vertical longitudinal sectional view through the filler neck of a vehicle radiator, showing my improved retaining device for connecting the radiator cap to the filler neck.

Figure 2 is a perspective view of my improved retaining device detached from the radiator cap and radiator filler neck.

Figure 3 is a top plan view of the radiator filler neck showing the shape of the opening therein which permits the retaining device to be inserted within the filler neck.

Figure 4 is a fragmentary vertical section taken on the line 4—4 of Figure 3 through the filler neck showing my improved retaining device in the position of being inserted within the filler neck and showing how the retaining device may be changed in form to diminish its length to permit such insertion.

Figure 5 is a fragmentary perspective view of a modified form of retaining device which will cause the radiator cap to always assume a definite predetermined position with respect to the filler neck when the cap is moved away from the filler neck opening.

While I have illustrated my improved retaining device as being associated with a radiator filler neck and a cap for closing such filler neck, it will be understood that it is equally useful in connection with closures for other kinds of containers.

In the drawing, the numeral 10 indicates the top tank of a vehicle cooling radiator, with which is associated a filler neck 12 of usual construction. This filler neck has formed on it an inwardly extending flange 14 having slots 16 provided therein, and a downwardly extending flange 18, the lower edge of which is inclined to form cam surfaces 20 which construction is well known in the art. The radiator cap 22 has secured to its under side, by means of screws 24, a locking bar 26 of well known construction, which locking bar is adapted to pass through the slots 16 when the cap is being applied in closing position upon the filler neck, and when the cap is rotated the ends of the locking bar ride up on the cam surfaces 20 to draw the cap down upon the top of the filler neck in sealing relation in a manner which is well understood by those skilled in the art.

To prevent the cap from being detached entirely from the filler neck and being mislaid or stolen, I have devised a form of retaining device which is very simple and economical to produce, but which functions in a manner different from any of the forms of retaining devices with which I am familiar. This retaining device consists of an anchoring element 28 which is comprised of two L-shaped parts 30 and 32, the bases of both parts being of channel shaped cross-section, and the base of the part 32 being narrower than the base of the part 30 and fitting within the side flanges and on top of the part 30. The vertical legs 31 and 33 of the parts 30 and 32 respectively, are curved to conform to the shape of the inner surface of the filler neck.

The two parts 30 and 32 are connected together by a tongue 34 formed on the part 32, which tongue extends downwardly and extends through a slot 36 which is formed in the part 30. A further means of securing the parts 30 and 32 together is a screw 38 which passes through a slot 39 formed in the part 32 and is threaded into a portion 40 which is struck outwardly from the part 30 to provide a sufficient number of threads. The lower end of the screw may be expanded or headed over as at 42 after the parts have been assembled to prevent accidental separation of the parts during the inserting operation hereinafter described.

An elongated opening 44 is formed in the part 30 and a connecting member 46 extends through this opening, the connecting member being free to slide loosely through the opening. The upper end of the member 46 is bent over as at 48 and this bent portion passes through an opening 50 which is formed in a T-shaped part 52 which is secured against the under surface of the locking bar 26 by the screws 24 which also serve to attach the locking bar to the radiator cap. The end of the bent portion 48 of the member 46 may be flattened as at 54 or enlarged in any suitable manner to prevent it from being withdrawn through the opening 50 in the T-shaped part 52. It will be obvious that the form of connection between the connecting member 46 and the T-shaped part 52 is such as to permit pivotal movement between the two. The lower end of the member 46 may be upset to form a head 56 or it may be enlarged in any other suitable manner such as by flattening or bending it, which head or enlarged portion is adapted to prevent the member 46 from being entirely withdrawn through the opening 44.

When it is desired to place the anchoring element 28 inside the filler neck, the screw 38 is loosened as far as possible, and this permits the part 32 to pivot about the point where the tongue 34 extends through the slot 36. The part 32 may then be moved into the position shown in Figure 4, in which position the overall length of the anchoring element is reduced sufficiently to permit the latter to be passed through the slots 16 of the filler neck flange 14. Using the connecting member 46 as a holding means, the anchoring element is lowered into the filler neck until the upper ends of the vertical legs 31 and 33 lie below the flange 14, after which the anchoring element may be turned to any desired position in the filler neck. The screw 38 has a non-circular opening 58 formed in it, and a wrench or screw driver of such shape as to fit into this opening is then utilized to tighten the screw 38, which tightening action causes the part 32 to swing downwardly about the pivot point where the tongue 34 fits into the slot 36. This of course increases the length of the anchoring element and causes the vertical legs 31 and 33 to be wedged into engagement with the inner surface of the filler neck, thus causing the anchoring element to be firmly held in place in the filler neck so that it cannot move laterally with respect thereto, the flange 14 preventing the anchoring element from being withdrawn upwardly out of the filler neck.

After the anchoring element has been thus increased in length, the non-circular opening 58 may be filled with any suitable material such as a piece of lead shot 60, which will prevent the insertion of a tool into the opening for the purpose of loosening the screw. The anchoring element may thus be locked in position in the filler neck so that it cannot be removed. The heads of the screws 24 may have similarly shaped openings formed in them, which openings may be plugged with any suitable material to prevent removal of them, or both the screws 24 and the screw 38 may have other well known locking type heads of any suitable kind formed on them to prevent their removal after the parts have been properly assembled.

It will be understood that the construction and arrangement of the parts of the retaining device is such that rotation of the radiator cap to permit the engagement of the ends of the locking bar 26 with the cam surfaces 20 is not interfered with when the cap is being applied in closing position upon the filler neck. During this rotating movement of the cap, the connecting member 46 merely rotates within the opening 44 in the part 30. Similarly when it is desired to remove the radiator cap from the filler neck to permit filling the radiator, the cap may be rotated to disengage the locking bar from the cam surfaces and to cause the locking bar to lie in a position wherein it may pass through the slots 16 in the flange 14 when the cap is lifted upwardly. As the cap is lifted upwardly, the connecting member 46 is pulled upwardly through the opening 44 in the part 30 until the head or enlarged portion 56 engages the under surface of the part 30. This engagement prevents any further movement of the cap away from the filler neck, and the cap may then be swung to a position at the rear side of the filler neck to expose the opening in the filler neck, which position is illustrated by the dotted lines in Figure 1.

Due to the fact that the vapors which are present in the radiator tend to condense on the under surface of the radiator cap, and since this condensate quite commonly during the winter months contains alcohol which is mixed with the water in the cooling system to form an anti-freeze solution, it is desirable to prevent this condensate from being permitted to drip onto the radiator shell 60 which partly encases the radiator, and which quite frequently is finished with enamel or lacquer which becomes spotted or discolored if alcohol is permitted to come into contact with it.

To overcome this difficulty, I have so shaped the radiator shell as to provide an annular trough portion 62 which surrounds the filler neck. As shown by the dotted lines in Figure 1, the length of the connecting member 46 is such that when the head 56 comes into contact with the under surface of the anchoring element, the radiator cap when swung to the rear side of the filler neck will be in a position wherein its lower edge will lie in the trough portion 62, so that any condensate which drips off the under side of the cap will fall into the trough portion. The liquid which drips into the trough portion may escape therefrom by draining downwardly through the clearance space 64 provided between the radiator shell 60 and the filler neck 12.

The radiator cap is caused to remain in the position shown by the dotted lines in Figure 1 because of the distribution of weight which is present when the cap is in this position. It will be seen that the weight of the cap will tend to pull the cap rearwardly away from the filler neck about a pivot or fulcrum point located where the lower edge of the cap rests in the trough portion 62, but such tendency to move in this direction would necessitate further upward movement of the connecting member 46 through the opening 44, and such movement is prevented by the engagement of the head 56 with the bottom surface of the anchoring element. A further advantage of this arrangement of parts is that the cap is prevented from coming into contact with any portion of the radiator shell outside of the trough portion 62, and therefore marring or chipping of the finishing material used on the shell is prevented.

In Figure 5 I have shown a slight modification of the form of connection between the anchoring element and the member 46. In this form of the invention, the connecting member 46 has formed on it immediately above the head 56 a flattened portion 70. The opening in the part 30 of the anchoring element through which the member 46 extends is formed with a circular central portion 72 which is of a diameter slightly larger than the diameter of the member 46, and at each side of this central portion of the opening are formed relatively narrow slots 74 which are slightly wider than the thickness of the flattened portion 70, the distance from the end of one slot to the end of the opposite slot being slightly greater than the width of the flattened portion 70. With this construction, the member 46 rotates in the central portion 72 of the opening when the cap is turned to disengage the locking bar from the cam surfaces, and when the cap is in a position to permit the locking bar to pass through the slots 16 in the filler neck flange, the flattened portion 70 of the member 46 will lie in a position wherein it will register with the slots 74, thereby permitting the flattened portion to be drawn upwardly into the slots 74 when the cap is lifted away from the filler neck, the head 56 engaging the under surface of the anchoring element to prevent complete withdrawal of the member 46 from the interior of the filler neck, in the same manner as is the case with the construction shown in Figure 1. The advantage of providing the flattened portion 70 which is adapted to fit into the slots 74 when the cap is moved to a position away from the filler neck opening is that this insures that the cap will always assume a position at the rear side of the filler neck opening, as shown by the dotted lines in Figure 1, since the engagement of the flattened portion 70 with the sides of the slots 74 keeps it from assuming any other position.

It will thus be seen that I have provided a closure retaining device which is simple and economical to produce, which may be easily changed in form to permit its insertion into the container filler neck, and which may then be locked in that position to prevent accidental misplacement or unauthorized removal of the closure. By securing the anchoring element firmly in place in the filler neck rather than letting it hang down into the radiator upper tank as is the case with the devices heretofore used, rattling noises caused by the anchoring device striking against adjacent parts are prevented, and by providing a trough portion into which the condensate collecting on the under surface of the cap may drip, and by so proportioning the parts of the retaining device that the cap will positively be held in a position wherein its lower edge will lie over this trough portion, spotting or discoloration of the finish of adjacent parts is prevented.

It will be realized that whereas I have described and shown a practical and operative device, it will be obvious that many changes might be made in the size, shape and disposition of parts without departing from the spirit of the invention. I therefore intend that the description and drawing shall be considered as being merely illustrative and diagrammatic rather than as limiting the invention to the specific showing.

I claim:

1. In combination with a container having a filler neck and a closure therefor, an anchoring element comprising two parts which may be moved relative to each other to diminish the length of the anchoring element to permit its insertion into the filler neck and which may then be moved relative to each other in such manner as to cause the ends of the anchoring element to come into engagement with the inside wall of the filler neck, means to lock the parts of the anchoring element together, and a member adapted to be connected to the closure and having a portion formed thereon which is adapted to engage said anchoring element when the closure is moved a predetermined distance away from the filler neck.

2. In combination with a container having a filler neck and a closure therefor, said filler neck having an inwardly extending flange formed at its upper end, an anchoring element comprised of two parts, one of said parts being movable relative to the other of said parts to diminish the length of the anchoring element to permit its insertion into the filler neck below said flange, means to cause the movable part of the anchoring element to assume a position which will increase the length of the anchoring element after the latter has been inserted in the filler neck, and a member adapted to be connected to the closure and having a portion formed thereon which portion is adapted to come into contact with the anchoring element when the closure is moved a predetermined distance away from the filler neck.

3. In combination with a container having a filler neck and a closure therefor, an anchoring element comprised of two parts which are so connected that one part may swing away from the other for the purpose of diminishing the length of the anchoring element to permit the latter to be inserted inside the filler neck, means adapted to draw the parts of the anchoring element together whereby the length of the latter will be increased after the anchoring element is placed within the filler neck, and a member adapted to be connected to the closure and having a portion formed at its opposite end which portion is adapted to engage the anchoring element when the closure is moved a predetermined distance away from the filler neck.

4. In combination with a container having a filler neck and a closure therefor, an anchoring element comprised of two parts which are so connected that one part may swing away from the other for the purpose of diminishing the length of the anchoring element to permit the latter to be inserted into the filler neck, means adapted to draw the parts of the anchoring element together whereby the length of the latter will be increased, means adapted to prevent subsequent movement of said drawing means, and a member adapted to be connected to the closure and having a portion formed thereon which portion is adapted to come into contact with the anchoring element when the closure is moved a predetermined distance away from the filler neck.

5. In combination with a container having a filler neck and a closure therefor, an anchoring element comprised of two parts, one of said parts having a pivotal connection with the other of said parts whereby the parts may be swung away from each other to diminish the length of the anchoring element to permit its insertion inside the filler neck, means connected to one of said parts of the anchoring element adapted to draw said parts together to increase the length of the anchoring element after the latter has been placed within the filler neck, and a member having one end adapted to be connected to the closure and having its opposite end adapted to engage the anchoring element when the closure is moved a predetermined distance away from the filler neck.

6. In combination with a container having a filler neck and a closure therefor, an anchoring element comprised of two parts, one of said parts having a slot formed therein, the other of said parts having a tongue extending through said opening, said tongue and slot connection serving as a pivotal connection between said parts whereby said parts may be swung away from each other to diminish the length of the anchoring element to permit its insertion into the filler neck, a screw threaded into one of said parts and adapted to engage the other of said parts in such manner that when said screw is tightened the parts will be drawn together to increase the length of the anchoring element after the latter has been placed within the filler neck, and a member adapted to be connected to the closure and having a portion formed thereon which portion is adapted to come into contact with the anchoring element when the closure is moved a predetermined distance away from the filler neck.

7. In combination with a container having a filler neck and a closure therefor, a locking bar, means to secure said locking bar to said closure, an inwardly and downwardly extending flange formed on said filler neck providing a cam surface which said locking bar is adapted to engage for the purpose of holding said closure in closing position upon said filler neck, an anchoring element adapted to be inserted within said filler neck beneath said flange, means to lock said anchoring element in position in said filler neck, and a member adapted to be connected to said closure by the same means which serves to connect said locking bar to said closure, said member having a portion formed thereon which is adapted to engage said anchoring element when the closure is moved a predetermined distance away from said filler neck.

8. In combination with a container having a filler neck and a closure therefor, an anchoring element adapted to be inserted within said filler neck, means adapted to lock said anchoring element in position within said filler neck, a member having a portion formed thereon which is adapted to engage said anchoring element when the closure is moved a predetermined distance away from said filler neck, means adapted to connect said member to said closure, and means adapted to prevent subsequent manipulation of either the means which serves to lock the anchoring element within the filler neck or the means which serves to connect the member to the closure.

9. In combination with a container having a filler neck and a closure therefor, an anchoring element adapted to be supported within said filler neck and having a non-circular opening formed therein, a member adapted to be connected to said closure, said member extending through the opening in said anchoring element and having a portion formed thereon which is adapted to engage said anchoring element when said closure is moved a predetermined distance away from said filler neck, said member having a non-circular portion formed thereon which is adapted to fit into the non-circular opening in the anchoring element for the purpose of holding the closure in a predetermined position when the latter is moved away from the filler neck.

STEPHEN DE ORLOW.